Nov. 7, 1933.    W. E. CRAWFORD ET AL    1,934,408
MEANS FOR ELECTRIC WELDING
Filed March 12, 1928    3 Sheets-Sheet 1
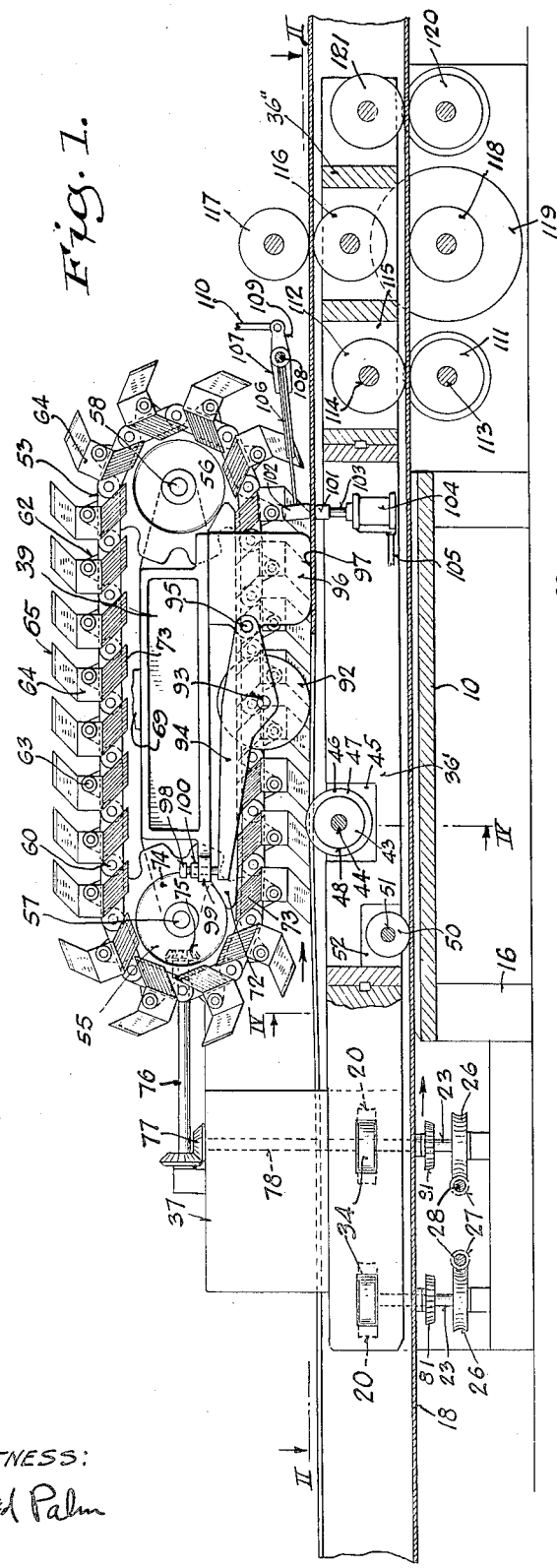
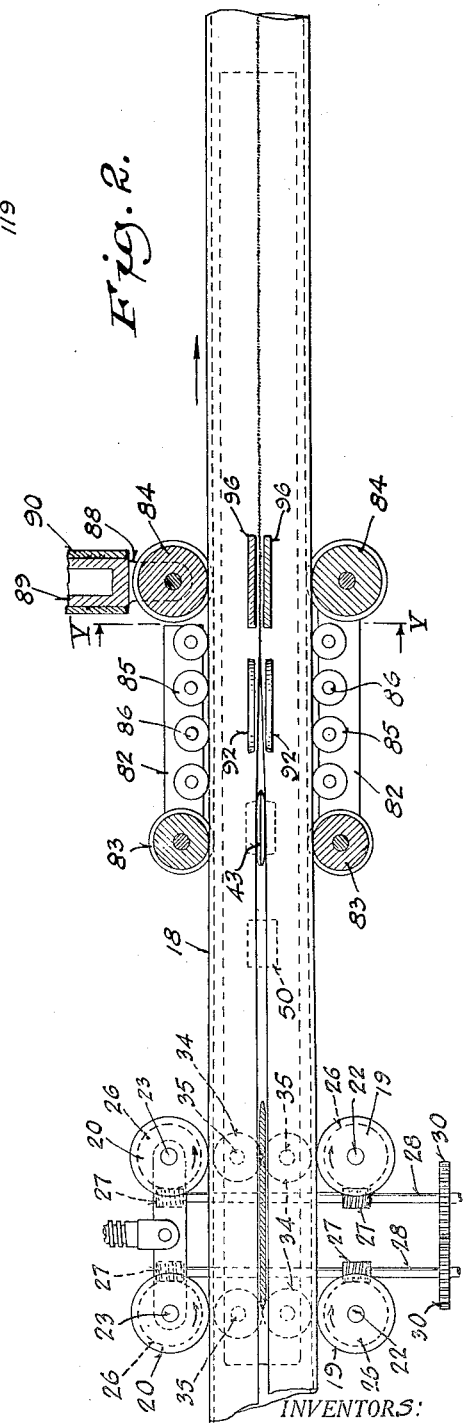
INVENTORS:
WILLIAM E. CRAWFORD
BY AND REIMAR C. F. KURTZE
ATTORNEY.

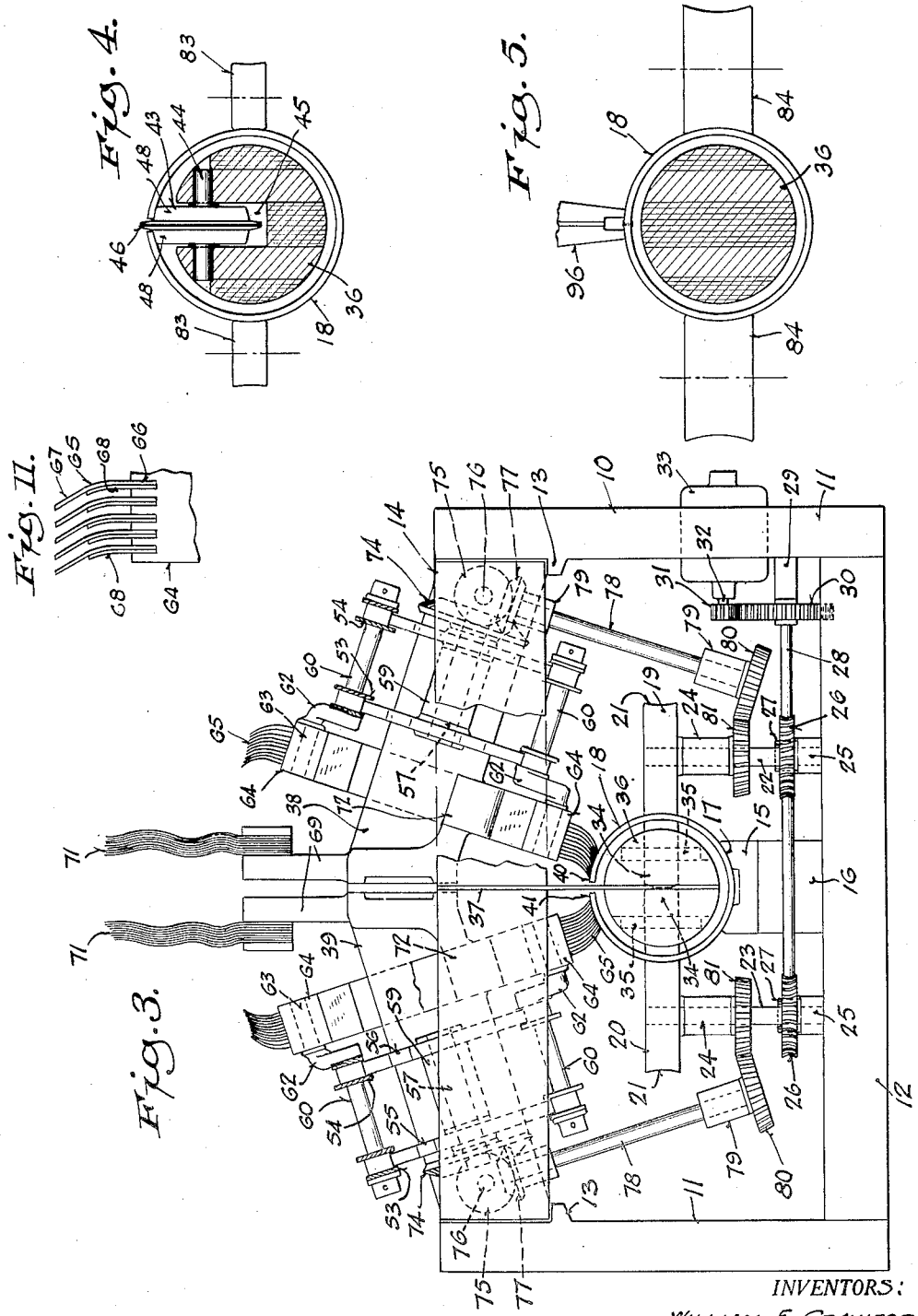

Nov. 7, 1933.    W. E. CRAWFORD ET AL    1,934,408
MEANS FOR ELECTRIC WELDING
Filed March 12, 1928    3 Sheets-Sheet 3
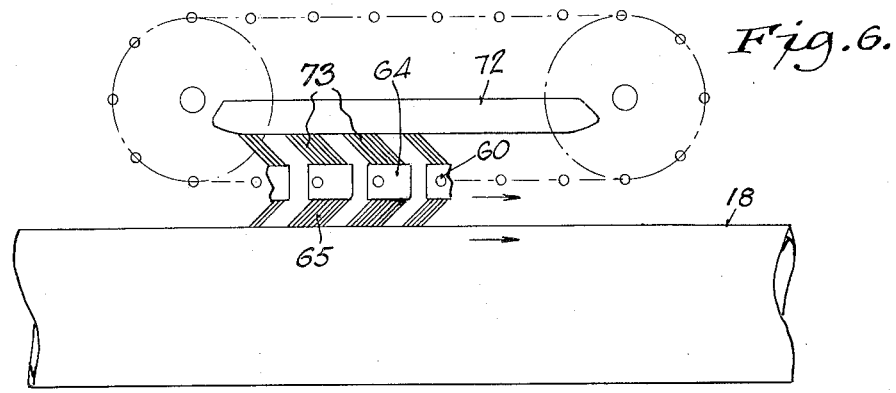
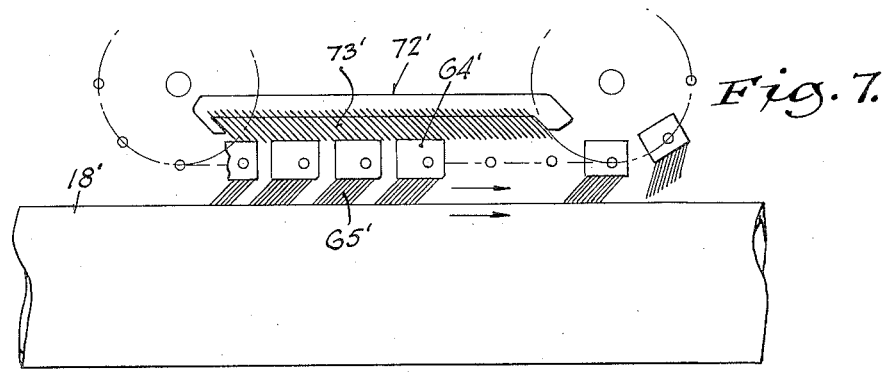
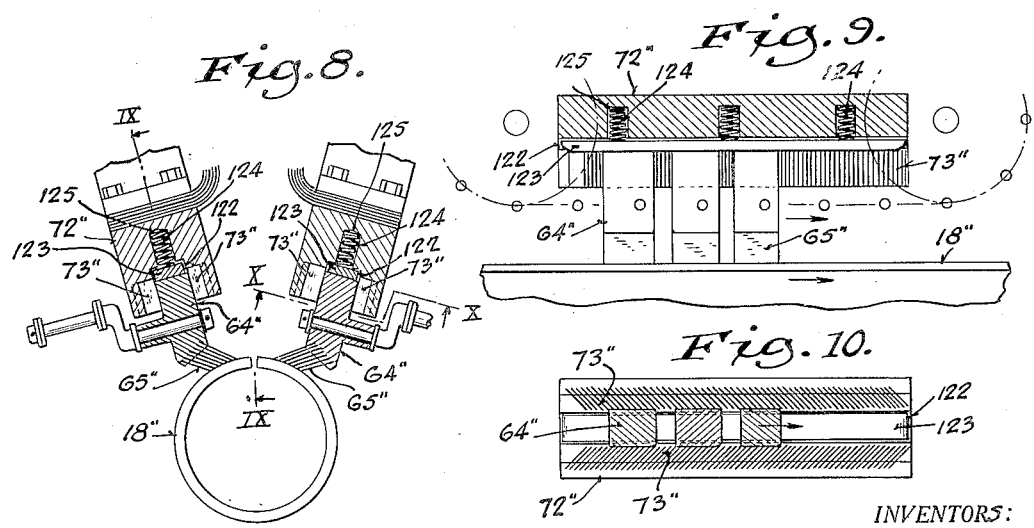
INVENTORS:
WILLIAM E. CRAWFORD
AND REIMAR C. F. KURTZE Patented Nov. 7, 1933

1,934,408

UNITED STATES PATENT OFFICE 1,934,408

MEANS FOR ELECTRIC WELDING

William E. Crawford, Wauwatosa, and Reimar C. F. Kurtze, Milwaukee, Wis., assignors to A. O. Smith Corporation, Milwaukee, Wis., a corporation of New York Application March 12, 1928. Serial No. 261,024

20 Claims. (Cl. 219—6)

This invention relates to a process and apparatus for electrical welding and particularly to progressive continuous resistance butt welding, although certain features thereof may be employed with equal advantages for other purposes.

Successful commercial welding practice of the class above referred to requires uniform sustained heating of the adjacent edges sufficient to effect the fusion and coalescence therebetween. Imperfect and irregular surfaces on the parts subjected to the electrical contacts of the welding machine tend to create concentrated and localized heated zones on the parts which are not conducive to effective welding and tend to destroy the electrical contacts in the welding machine.

Numerous electrical processes and devices of the class above referred to have heretofore been proposed, but these have not proved entirely successful for the progressive continuous resistance butt welding due to the inability to avoid irregular heating of the edges to be welded and the inability to prevent excessive temperatures in the vicinity of the contacts. Because of these disadvantages, the proposed processes and devices have not heretofore been put into commercial use in the manufacture of articles wherein a weld having the maximum strength of the walls of the articles themselves is necessary, such as in the manufacture of pipes employed for the transportation of water, oil, and other fluids under pressure.

One object of the present invention is to provide a novel method of producing sustained uniform heating of the adjacent edges to be welded prior to effecting a weld therebetween.

Another object of the invention is to simplify the construction and operation of a machine of the character mentioned.

Still another object is to provide electrical contacts for engaging the parts to be welded which are capable of conforming with the irregularities existent on the contacting surfaces of the article to be welded.

A further object is to create metallic fusion temperatures in edges to be welded without injury to the electrical contacts of the welding machine.

A further object is the provision of resilient electrical contacts which are yieldable to conform with the surfaces of the parts to be welded so as to create an effective electric connection therebetween.

Still a further object is to effect a joinder of the adjacent edges of the article or articles to be welded by conducting uniform electrical heating currents between the edges simultaneously with the passage of the article.

A still further object is to provide an electrode construction which will enable the same to be maintained at a reduced temperature by permitting natural or forced circulation of atmosphere through the contacts.

Other objects and advantages will appear from the following description and illustrative embodiment of the invention.

In the drawings:

Figure 1 is a longitudinal sectional view of the device embodying the features of the present invention.

Fig. 2 is a sectional view taken on line II—II of Figure 1.

Fig. 3 is an end view of the device disclosed in Figure 1.

Fig. 4 is a fragmentary sectional view taken substantially along the line IV—IV of Figure 1.

Fig. 5 is a fragmentary sectional view taken along line V—V of Fig. 2.

Fig. 6 is a fragmentary view of the electrical conducting means shown in conventional outline.

Fig. 7 is a view similar to Fig. 6 but showing a modified embodiment of the electrical conductors.

Fig. 8 is a sectional view illustrating a still further embodiment of the electrical conductors.

Fig. 9 is a sectional view taken along the line IX—IX of Fig. 8.

Fig. 10 is a sectional view taken along the line X—X of Fig. 8.

Fig. 11 is a fragmentary detailed view of a contact carrier block.

The invention contemplates more particularly a manner of effecting an improved application of electrical currents to the parts to be welded to provide uniform and prolonged fusion heats for welding purposes.

The structure selected for illustration discloses the invention as applied to the manufacture of pipes employed in the transmission of oil, water, and other fluids under pressure.

In the drawings, the numeral 10 indicates a frame provided with suitable standards 11 which are maintained in rigid spaced relation by suitable cross members 12, suitably secured to the lower extremities thereof. The standards 11 are provided with inwardly extending lugs 13 intermediate their extremities for supporting elongated members 14 which latter serve to sustain instrumentalities constituting the superstructure of the machine in proper suspension as will be more fully described hereinafter.

An elongated member 15 is disposed longitudinally of the frame 10 and is supported on suitable standards 16 which rest on the floor or foundation of the frame 10. As shown in Fig. 3, the elongated member 15 has a longitudinally disposed concavity 17 having a curvature corresponding to the curvature of the tubular member 18 and thereby guides the movement of the article during the welding process.

To decrease the friction occasioned by the traverse of the tubular article 18 within the concavity 17 and provide a receptacle to receive foreign substances, such as scale and flash resulting from the welding process, a longitudinal trough is provided in the member 15 and thereby reduces the area of contact between the member 15 and the tubular article.

In order to feed the tubular member 18 along a predetermined path for progressively welding the adjacent edges thereof, the apparatus is provided with pairs of aligned rollers 19 and 20, as is clearly shown in Fig. 2. In this instance, four rollers are provided which latter have concave peripheries 21 conforming to the curvature of the tubular article 18.

The rollers 19 and 20 frictionally engage the article 18 in a horizontal plane which enables the rollers to be mounted on a corresponding number of vertically disposed shafts 22 and 23, respectively. The shafts 22 and 23 are journaled in suitable bearings 24 disposed directly beneath the pairs of rollers 19 and 20, as is clearly shown in Fig. 3. The shafts are further provided with bearings 25 supported on one of the cross members 12 of the frame 10.

Worm wheels 26 are secured to the individual shafts 22 and 23 directly above the vertical bearings 25 and are adapted to mesh with the worm gears 27 secured to the drive shafts 28 which are journaled in suitable bearings 29, as shown in Figs. 1 and 3. Spur gears 30 are secured to the shafts 28 near the extremities thereof to mesh with each other and to a pinion gear 31 carried by a shaft 32 of an electrical motor or other suitable power source.

As shown, the motor 33 is supported on the frame 10 and imparts opposite rotation to the shafts 28 which causes the rotation of the feed rollers 19 and 20 to effect the traverse of the tubular member 18 which latter is guided along a predetermined path defined by the concavity 17 in the article support 15.

Rollers 34, in this instance four, are journaled on vertical shafts 35 which latter are secured within recesses provided in a substantially cylindrical mandrel 36 suspended in the path of the tubular member 18 by an erect supporting plate 37. The plate 37 is supported in position by the cross members 14 constituting a part of the superstructure of the frame 10 hereinbefore referred to.

The cylindrical mandrel 36 is of less diameter than the tubular member 18 so as to pass interiorly thereof to sustain the rollers 34 in confronting relation with the feed rollers 19 and 20 to frictionally carry the member 18 in a linear path for effecting a progressive movement of the tubular member.

The tubular member 18 is preferably first formed from a flat strip of metal in any suitable manner by a preliminary shaping operation effected separately or simultaneously with the welding operation, as commercial practice may dictate in the premises.

The mandrel 36 extends rearwardly of the feed rollers 19 and 20 and receives a roller 43 which is carried by a horizontally disposed shaft 44 journaled in a recess 45 provided therein.

The periphery of the roller 43 is preferably provided with a comparatively sharp edge 46 defined by beveled portions 47 which terminate in a shoulder 48 impinging against the interior of the tubular member 18 adjacent the abutting edges thereof. The roller 43 is so proportioned in size and so positioned that the peripheral portions of the same will pass between the edges of the tubular member 18 and the shoulder 48 and exert pressure against the interior surface of the tubular stock 18 adjacent the edges thereof and cause the lips or portions adjacent the edges to be radially distorted outwardly, and to maintain said edges in definite spaced relation. As shown in Fig. 4, the roller 43 is insulatingly supported in the mandrel 36 and the opposite sides of the roller are insulated from each other to prevent short circuiting of the current through the roller edge.

Another roller 50, carried by a horizontal shaft 51 journaled in the recess 52, is provided in an extension 36' of the mandrel 36 in the vicinity of the roller 43 and at the opposite side of the tube so as to prevent the tube from raising during the distortion of the lips adjacent the edges 40 and 41.

The supporting plate 37 projects through the space between the separated edges. The lips of the tubular member adjacent the edges 40 and 41 are subjected to heat currents to secure a sustained heating thereof by passing an electric current between properly positioned and linearly movable electrodes adjacent said edges.

Each electrode preferably comprises a pair of endless linked carriers 53 and 54 which mesh with spaced sprocket wheels 55 and 56 mounted on shafts 57 and 58, as is clearly shown in Figs. 1 and 3. The shafts 57 and 58 are journaled in suitable bearings 59 supported by the brackets 38 and 39, respectively, on both sides of the frame 10.

It will be noted in Fig. 3 that the linked carriers 53 and 54 are maintained in spaced relation by means of a series of pins 60 which constitute the pivotal connectors for the linked carriers 53 and 54 of each electrode. The confronting flexible endless carriers 53 of each electrode have secured thereto a plurality of uniform spaced insulated brackets 62 having outwardly projecting stub pins 63 for supporting individual blocks 64 which latter are adapted to be moved by the carriers 53 and 54 so as to travel in an endless path in confronting relation with the tubular stock 18 to an extent determined by the span of the aligned sprockets 55 and 56.

Each of the blocks 64 is provided with a plurality of flexible conducting strips 65 and 73 disposed on the opposite faces thereof, as shown in Figs. 1 and 6. The conductor strips are preferably of copper and have end portions thereof imbedded, as at 66, in the blocks 64 so as to provide exposed portions 67 which are in inclined position to effect a slidable and yieldable contact with the surfaces adjacent the edges 40 and 41 of the tubular stock 18 and with a conductor bar 72, more specifically referred to hereinafter.

A resilient member 68 is positioned adjacent each contact strip 65 and 73 and is imbedded therewith in order to aid in maintaining the exposed portion of the contact strips in their normal position.

Transference terminals 69 of any suitable construction are supported by the brackets 38 and 39 at the juncture thereof, as is shown in Fig. 3. The transference terminals are connected to the secondary of a suitable welding transformer (not shown) by means of the secondary conductors 71. The transference terminals are provided with elongated conductor bars 72 which are disposed intermediate the sprocket wheels 55 and 56 and confront the flexible strips 73 on the blocks 64 secured to the carriers 53 and 54.

An electric current of suitable welding strength is taken from the secondary of the welding transformer and passed through the conductor bars 72 and thence through the laminated strips 73, blocks 64, and laminated strips 65 to the adjacent edges of the tubular member 18 to effect a sustained heating thereof during the traverse of the tubular member 18 caused by the feed rollers 19 and 20.

A linear movement of the blocks 64 and their contact strips is effected in accordance with the travel of the article being welded so that the electrode and the article will travel in unison and thus eliminate friction between the electrodes and the contacting surfaces of the article being welded. To this end the shafts 57 of the electrode carriers are provided at the outer extremities thereof with bevel gears 74 which mesh with angularly disposed bevel gears 75 carried by transverse shafts 76 suitably journaled in the superstructure of the welding machine. The other extremity of the transverse shafts 76 are provided with bevel gears, meshing with similar gears 77 carried by divergent shafts 78 journaled in suitable bearings 79, as is clearly shown in Fig. 3.

The divergent shafts 78 are provided at their lower extremities with gears 80 which mesh with similar gears 81 secured on the shafts 22 and 23 which actuate the feeding rollers.

It will be noted from the structure above-described that the electrode carriers and the article being welded are driven through the same power source and, by properly proportioning the gears on the several shafts, the rate of feeding of the article to be welded may be made the same as that of the rate of movement of the electrode carriers.

With the arrangement of parts thus far described, it will be apparent that the tubular member 18 to be welded is caused to move in a linear predetermined path and simultaneously with the rotation of the sprocket wheels 55 and 56 which drive the endless carrier and blocks 64. The laminated flexible strips 65 contact with the surface of the tube 18 in proximity to the edges 40 and 41 on each side thereof to effect the passage of the welding current.

The linear travel of the conducting strips 65 with the tube causes a sustained passage of current across the edges and effects a sustained heating of the edges to be welded. The length of time of the application of current to any given portion of the edges will depend upon the speed of travel and the distance of contact of the edges between the sprocket wheels 55 and 56.

By adjusting the relative positions of the roll 43 and the electrodes, and thereby the length of contact of the edges between the sprocket wheels 55 and 56, any suitable or required heating of the edges may be obtained.

It will, furthermore, be noted that the flexible contacts 65 will yield to compensate for irregularities of the tube surfaces and thus tend to induce a uniform heating and the prevention of arcing with the resultant injuries to the electrodes, and that the laminated contacts will readily permit the circulation of air therebetween for cooling the same.

The invention further embodies mechanism disposed adjacent the end of the heating zone for causing a coalescence of the adjacent heated edges to effect a completed weld. This mechanism preferably comprises horizontally disposed clamping members on opposite sides of the tube. Each of the clamping members includes a bracket 82 extending longitudinally of the article to be welded which brackets have journaled therein a plurality of grooved rollers 83 and 84 adjacent the extremities thereof to contact with the periphery of the tubular member 18. Intermediate smaller rollers 85 of any suitable number, in this instance four, are rotatably supported on vertically extending stub shafts 86 on the brackets 82 to effect a gradual approach of the tubular edges 40 and 41 thereof.

The engaging lines of oppositely disposed rollers 83, 84, and 85 are convergent with respect to the path of travel of the tube 18 so as to cause the edges to gradually approach, meet, and be pressed together to effect a coalescence of the adjacent edges. To this end, the rollers 84 are larger in diameter than the rollers 83. One of the rollers 84 is journaled on a forked extension 88 of a piston 89 which reciprocates within a tubular member 90. Any suitable actuating means (not shown) may be employed to control the position of the piston 89 so as to create the proper pressure reaction on the tube 18 between the rollers 84, it being preferable to maintain the greatest side pressures between the rollers 84.

In order to maintain the abutting edges to be welded in proper alignment, surface guides are suspended from the brackets 38 and 39.

The mechanism further includes a pair of surfacing guide wheels 92 positioned on each side of the edges 40 and 41, such guide wheels being mounted on a shaft 93 carried by a lever 94 having one end thereof pivoted as at 95 to plates 96 which depend from the brackets 38 and 39, and the other end of said lever engaging an adjusting screw 98 which projects through a lug 99 formed on the brackets 38 and 39. The adjusting screw is provided with a lock nut 100 to retain it at any desired position.

The plates 96 depend from the brackets 38 and 39 and engage the surface of the tubular article to form a welding shoe. The lower edges 97 of the plates 96 preferably project slightly below the peripheries of the rotary surface guides 92 and operate therewith to gradually remove the previously formed bulge in the lips of the tubular member caused by the rotary distorting member 43 hereinbefore referred to.

As illustrated in Figs. 1 and 2 of the drawings, it is preferable to maintain the edges in spaced relation during the initial portion of their travel between the electrodes and to press the edges together progressively to provide a concentration of current flow across the edges to obtain the required uniform welding temperature. The actual flow of welding current across the seam is confined to the region between the closing rolls 92 and the pressure or welding rolls 84, while a preheating flow of current is obtained longitudinally along the spaced edge portions in the region between the rolls 43 and 92. This construction allows for the supply of welding potential over an extended longitudinal region of the seam while providing a concentrated flow of welding current across the seam to obtain the required uniform welding temperature, and at the same time providing the required take-up for the reduction in diameter of the pipe due to the welding of the edges.

It is desirable that the machine be so adjusted that the edges 40 and 41 commence to coalesce directly beneath the depending plates 96 due to the side pressure being exerted on the tube by the welding rollers 84.

Permanent coalescence and removal of burr and flash caused by the welding operation is effected by subjecting the tube to the operation of a mechanical hammer comprising a pair of oppositely disposed vibratory dies 101 and 102. The dies are positioned on the interior and exterior sides of the tubular article to exert a pressure thereon just prior to the final setting thereof.

To this end, the die 101 is secured to a piston 103 reciprocable within a cylinder 104 which is connected to a conduit 105 for conducting a suitable pressure medium to the interior of the cylinder 104 for imparting a vibratory motion to the die 101 or for adjusting the position of said die.

The confronting die member 102 is carried by a rod 106 which projects within an arm 107 which latter is pivoted as at 108. The other lever end 109 of the arm 107 is operated by the rod 110 to actuate the die 102 to thereby subject the seam formed by the joinder of the edges 40 and 41 to a vibratory hammering action just after the final setting of the edges. Instead of employing a vibratory hammering action, the dies 101 and 102 may be adjusted to relatively stationary positions whereby the plastic welding metal of the seam may be squeezed therebetween.

In order to overcome irregularities in shape and size and to remove undesirable internal stress conditions in the pipe it is preferable to subject the welded pipe to the action of a series of shaping or straightening and sizing rolls.

For this purpose a pair of rolls 111 and 112 are arranged to the rear of the hammer dies 101 and 102, the roll 111 being mounted on a horizontal shaft 113 journaled in the frame substructure below the pipe and the roll 112 being mounted on a horizontal shaft or axle 114 journaled in the walls of a recess 115 in the frame 36″ which constitutes an extension of the mandrel 36. These rolls 111 and 112 operate to press the lower portion of the pipe between them.

A similar pair of rolls 116 and 117 are arranged to press the top side of the pipe including the welded seam, the roll 116 being mounted in the mandrel extension 36″ and the roll 117 being mounted on the machine frame.

A guide roll 118 is arranged beneath the rolls 116 and 117 and has a grooved periphery 119 corresponding with the curvature of the pipe to guide the pipe through the shaping rolls and to relieve the latter of the weight of the pipe. This roll further functions to prevent bowing of the pipe by the other rolls and to aid in straightening the pipe. Additional rolls 120 and 121 similar to rolls 111 and 112, respectively, are arranged to the rear to cooperate with the other rolls and prevent distortion of the pipe thereby.

It will be apparent from the above description that the adjacent edges of the article or articles to be welded may be fused and electrically welded simultaneously with the traverse thereof owing to the fact that heating currents are sustained for a prolonged interval and are further uniformly distributed to preclude concentrated areas of elevated temperatures. The yielding nature of the contacts 65 enables the same to conform with the surfaces of the tube in the vicinity of the edges 40 and 41 thereof to insure proper electrical connections conducive to uniform heating and to cause the edges 40 and 41 to become plastic after which they are caused to coalesce due to the pressure applied through the pressure rolls.

The construction of the electrodes and the contact blocks may be modified, as shown in Fig. 7, wherein is illustrated diagrammatically a plurality of electrode blocks 64′ having imbedded in one surface thereof flexible strips or contact brushes 65′ adapted to engage the surface of the tube to be welded. The opposite side of the contact blocks is smooth and adapted to engage flexible contacts 73′ carried by the conductor bar 72′.

Still a further modification of the electrode structure resides in causing the contact blocks 64″ to pass within grooves 122 and 123 provided in the faces of the conductor bars 72″ which latter are provided with flexible contact members 73″ imbedded in the sides of the groove 122 to brush against the corresponding side surfaces of the carrier blocks 64″, as shown in Figs. 8, 9, and 10.

In order to normally urge the contact plates 65″ into contact with the article 18″ and to provide further conducting surfaces, plates 123 are inserted within the groove 122 adapted to engage the top of the carrier block 64″ opposite to the side in which the flexible contact plates 65″ are imbedded.

Tension strings 124 are disposed in suitable recesses 125 to normally urge the plates 123 against the carrier blocks 64″.

The invention further contemplates the provision of rollers in lieu of plates 123, above-referred to, for reducing the friction between the coacting parts to a minimum.

Various changes and modifications may be made without departing from the spirit of the invention and the scope thereof as defined in the appended claims.

We claim:

1. The combination with means for moving an article to be welded along a predetermined path, of means movable with said article for a predetermined distance, and resilient contact members carried by said means to engage said article and conduct welding current thereto.

2. The combination with an electrical source, of means for feeding an article along a predetermined path, carrier means movable in confronting relation with the article, and flexible brushes on said carrier adapted to contact with the article to conduct heating current thereto from said electrical source.

3. The combination with an electrical source, of means for feeding an article along a predetermined path, carrier means movable in confronting relation with the article, and flexible brushes on said carrier adapted to contact with the article to conduct heating currents thereto from said electrical source, said flexible brushes being adapted to conform with the surface of said article to create an effective contact therebetween.

4. The combination with an electrical source, of means for feeding an article along a predetermined path, carrier means movable in confronting relation with the article, flexible brushes on said carrier adapted to contact with the article to conduct heating current thereto from said electrical source, said flexible brushes being adapted to conform with the surface of said article to create an effective contact therebetween, and means for moving said brushes in unison with said article.

5. The combination with an electrical source, of means for feeding an article along a predetermined path, carrier means movable in confronting relation with the article, flexible brushes on said carrier adapted to contact with the article to conduct heating currents thereto from said electrical source, said flexible brushes being adapted to conform with the surface of said article to create an effective contact therebetween, means for moving said brushes in unison with said article, and means for stressing said article at a predetermined position of travel to effect coalescence of the parts thereof.

6. The combination with means for feeding articles along a predetermined path, of an electrical lead disposed in confronting relation with the path of said article, a carrier, flexible contact members associated with said carrier, and means for imparting movement to said carrier to effect the conductance of heating currents from said lead to said articles during the travel thereof.

7. The combination with means for feeding articles along a predetermined path, of an electrical lead disposed in confronting relation with the path of said article, a carrier, flexible contact members associated with said carrier, means for imparting movement to said carrier to effect the conductance of heating currents from said lead to said articles during the travel thereof, and resilient means associated with said flexible contact members to impart rigidity thereto.

8. The combination with means for feeding tubular members along a predetermined path, of means in the path of said tubular members to effect radial distortion for separating the abutting edges thereof, elongated electrical leads disposed in confronting relation with the tubular members, flexible means for conducting heating currents from said electrical leads between the edges of the tubular member during the traverse thereof, and means in the path of the tubular members to cause the approach of the edges for effecting the coalescence thereof.

9. An apparatus for the progressive electrical butt welding of tubular articles comprising means for moving the tubular blank to be welded along a predetermined path, resilient electrodes disposed adjacent the edges to be welded and having successive portions thereof movable with and at the speed of the tubular blank for a predetermined distance, and means for progressively maintaining portions of said edges between said electrodes in separated relation to concentrate the passage of welding current across said edges.

10. In an apparatus for the progressive electrical butt welding of tubular articles, the combination of means causing the movement of a tubular blank along a predetermined path, resilient electrodes adjacent said edges having successive portions thereof movable with the tubular blank for a predetermined distance, and means for radially distorting the lips of a portion of said tubular blank between the electrodes to progressively maintain the same in separated relation prior to the passage of welding current thereacross.

11. In an apparatus for the electrical resistance butt welding of tubular articles, the combination of means for causing the tubular blank to move in a predetermined path, resilient current conveying means movable in contact with the tubular blank for a predetermined distance to supply welding current to the edges of the blank, a mandrel disposed within the tubular blank, and means carried by said mandrel for causing the radial distortion of the lips of a portion of the tubular blank between said current conveying means to separate the edges prior to the passage of welding current thereacross.

12. In an apparatus for the electrical resistance butt welding of tubular articles, the combination of means for causing the movement of a tubular article along a predetermined path, current conveying means contacting with the lips of the tubular article and movable therewith for a predetermined distance to effect a prolonged heating thereof by passing welding current thereacross, a roller having a knife edge periphery supported within the tubular article, and shoulders on said roller engaging the inner walls of the lips of the tubular article for lifting the same to cause a separation of a portion of the edges thereof between said current conveying means prior to the heating and welding operations.

13. In an apparatus for the electrical resistance butt welding of tubular articles, a brush electrode having a plurality of resilient members contacting with the article to be welded and movable therewith for a predetermined distance to effect a prolonged heating of the edges to be welded and means for conveying an electric current to said brush electrode.

14. In an apparatus for progressive electrical resistance butt welding, endless carriers having portions thereof adapted to move into confronting relationship with the article on opposite sides of the seam to be welded, means for moving the article in a predetermined path in the direction of said seam, means for moving the confronting portions of said endless carriers with and at the speed of the article to be welded, a plurality of resilient members mounted on said carriers and adapted to contact with the lips of the article, and means for conveying an electric current to said resilient members.

15. In an apparatus for the progressive resistance butt welding of tubular articles, endless carriers having successive portions thereof adapted to move into confronting relationship to the tubular article on opposite sides of the seam to be welded, means for moving the article in a predetermined path in the direction of said seam, means for moving the confronting portions of said carriers with and at the speed of the tubular article, resilient means mounted on said carriers and adapted to contact with the tubular article on opposite sides of said seam, and resilient means for conveying an electric current to said first mentioned resilient means.

16. In an apparatus for the progressive electric butt welding of tubular articles, the combination of means for moving the tubular article in the direction of the seam to be welded, endless carriers having successive portions thereof adapted to move into and out of confronting relation to the tubular article on opposite sides of said seam, means for moving the confronting portions of said carriers with and at the speed of the tubular article, electro-conductive members supported by said carriers, resilient means secured to said members and contacting with the surface of the tubular article adjacent the edges to be welded, an electric terminal extending longitudinally of said carriers and arranged in confronting relationship to said electro-conductive members, and resilient means arranged between and in contact with said terminal and said electro-conductive members contacting with the surface of the tubular article, to thereby convey the welding current from said terminal to said tubular article.

17. In an apparatus for the progressive electric butt welding of tubular articles, the combination of means for moving the article in the direction of the seam to be welded, an endless carrier having successive portions thereof adapted to move into and out of confronting relation with the tubular article on each side of the seam to be welded, said confronting portions being adapted to move with and at the speed of the tubular article, electro-conductive members supported by said carrier, resilient means secured to said members and contacting with the tubular article on each adjacent seam to be welded and adapted to exert a predetermined pressure thereon, an electric terminal extending longitudinally of said carriers, said terminal having a longitudinal recess therein for the passage of the electro-conductive members having resilient means engaging the tubular article, and resilient members embedded in the side walls of said recess for contacting with the side walls of said members to thereby effect a passage of electric current from said terminal to the tubular article to be welded.

18. In an apparatus for the progressive butt welding of tubular articles, the combination of means for moving the article in the direction of the seam to be welded, an endless carrier having successive portions thereof adapted to move into and out of confronting relation with the tubular article on each side of said seam, said confronting portions being movable with and at the speed of the tubular article, electro-conductive blocks supported by said carrier and movable therewith, means on said conductive blocks for engaging the tubular article adjacent the seam to be welded, an electric terminal extending lengthwise of said carrier and having a recess therein for the passage of said blocks, flexible members secured to the side walls of said recess for engaging the side walls of said blocks, and resilient means for urging said blocks into contact with the tubular article.

19. In an apparatus for the progressive electric butt welding of tubular articles, the combination of means for moving the tubular article in the direction of the seam to be welded, resilient of electrodes adapted to engage the article to be welded on opposite sides of said seam, means causing successive portions of said electrodes to engage and travel with said article a predetermined distance, means providing a separation of the edges to be welded between said electrodes, and means for subsequently causing the gradual approach and coalescence of said edges within the zone of travel of the electrodes in contact with the article.

20. In an apparatus for progressively welding a longitudinal seam in a tubular blank, the combination of flexible endless electrodes for conveying welding current to the edges to be welded, resilient contacting members forming a part of said electrodes and adapted to engage the blank on opposite sides of the seam, means for effecting pressure contact between said blank and said resilient members sufficient to deflect the latter, means for longitudinally moving said blank past said electrodes, and means for moving successive portions of said electrodes in unison with said blank for a predetermined distance.

WILLIAM E. CRAWFORD.
REIMAR C. F. KURTZE.